United States Patent Office 2,914,946
Patented Dec. 1, 1959

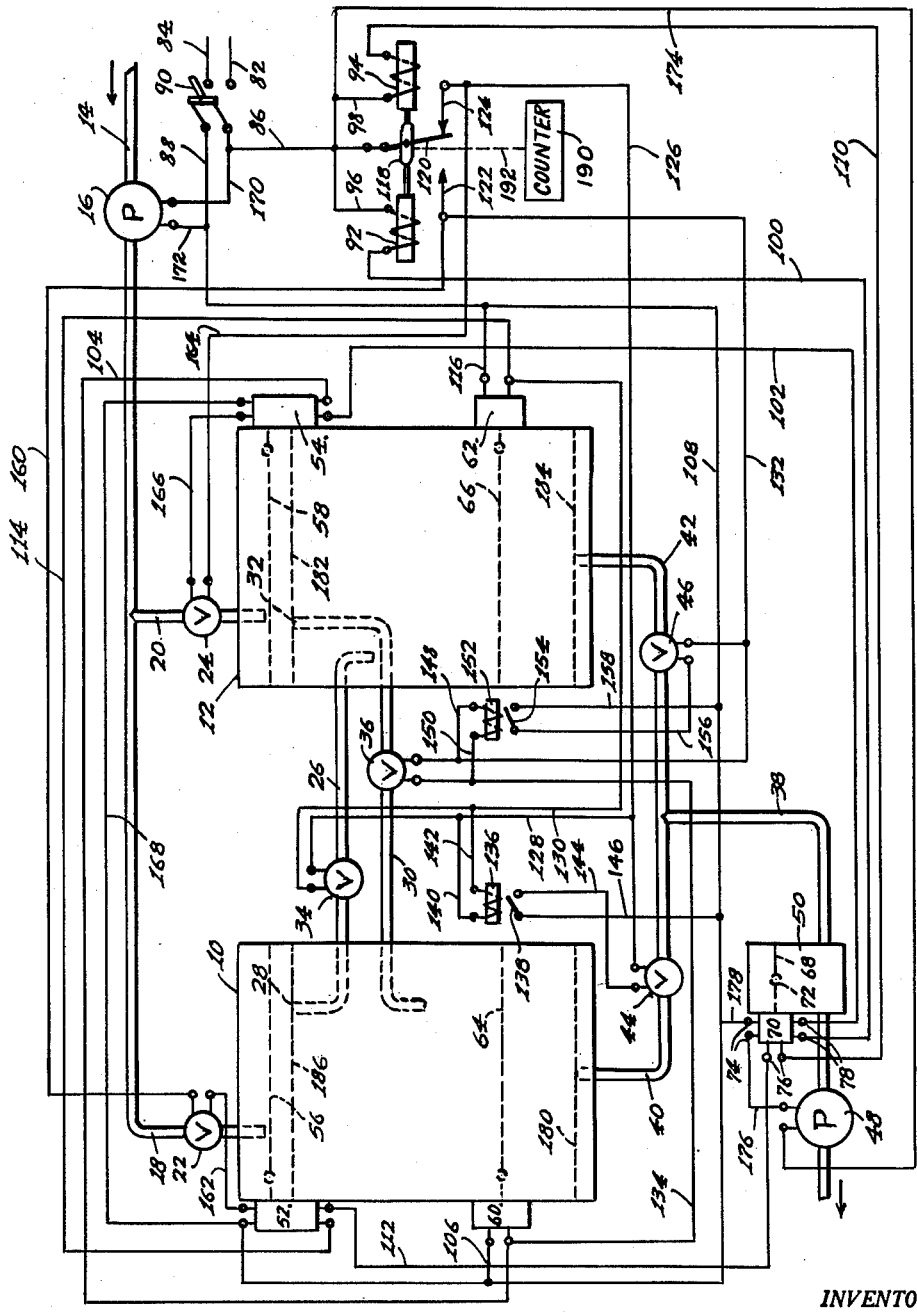

2,914,946

LIQUID MEASUREMENT

Samuel H. Pope, Wichita, Kans., and Ross M. Stuntz, Jr., Tulsa, Okla., assignors to Gulf Oil Corporation, Pittsburgh, Pa., a corporation of Pennsylvania Application March 9, 1955, Serial No. 493,123

7 Claims. (Cl. 73—219)

This invention relates to apparatus for measuring a liquid, and pertains more particularly to the synchronized use of a plurality of measuring vessels to obtain a high over-all rate of accurate liquid measurement.

In its simplest form, the broadest aspect of the invention pertains to apparatus for cyclically filling a vessel with a liquid to a predetermined level, allowing the liquid to settle or rest for a time interval sufficient to allow at least most entrained gases to escape and heavier suspended solids to settle out, then discarding liquid from the vessel until a predetermined level therein is reached, and then removing liquid from the vessel to a predetermined lower level with such removed liquid constituting the measured unit volume of the liquid. Means can optionally be provided to record automatically various data with respect to the measured liquid, such as to the number of units measured, their temperatures, densities, electrical properties, etc.

Another aspect of the invention pertains to apparatus for performing the above-described cyclic operation with respect to a plurality of vessels in a synchronized manner, so that one vessel can be filling while a measured unit volume of liquid is being removed from another vessel. The interrelation of the cyclic operation of the vessels is preferably also such that the liquid discarded from one vessel is introduced into one of the other vessels while the latter is being operated in its filling phase.

More specifically, in a simple embodiment of the invention involving only two similar measuring vessels, the cycle of each vessel consists of two major phases, which may be termed phases A and B. Phase A consists of the sequential filling and settling operations referred to previously, and phase B consists of the sequential discarding (more appropriately the overflowing) and the removal (more appropriately the draining) operations referred to previously. The invention relates to apparatus for so controlling the operation of the two vessels that whenever either vessel is in major phase A the other vessel is in phase B, and so that neither vessel can enter its next major phase until both vessels have fully completed all operations of their current major phases. Also, as each of the vessels discards or overflows during its B phase into the other vessel that is in its A phase, the major phases are further interrelated in that the overflow of one vessel occurs during an earlier portion of the filling cycle of the other vessel.

In greater detail, where two vessels are employed, the control conditions are such that for one vessel to pass from phase B to phase A, the flow of liquid draining from such vessel must have ceased and the other vessel have been filled. Upon such conditions being met, said one vessel commences filling with the other vessel being free to overflow thereinto until said one vessel has filled to an extent that, considering the rate of its filling, sufficient time will have elapsed for the other vessel to have completed its overflowing. Upon said one vessel being filled to said extent the outer vessel commences drainage. The rate of draining is sufficiently slower than the rate of filling that the draining of the other vessel will not be completed until said one vessel has been filled for a sufficient time for the liquid therein to have settled.

The invention also pertains to electrical control means for accomplishing the above functions that can be connected for operation to a commercial electrical energy power source, such means being so constructed and arranged that upon interruption of electrical power all filling, overflowing and draining functions of the vessels immediately cease, and upon resumption of electrical power, all such functions resume at the same point that they ceased.

The invention can be best understood upon reference to the accompanying drawing, which is a schematic representation of the vessels and their associated conduit system, together with the diagrammatic representation of the electrical control system operatively connected thereto.

Referring to the accompanying drawing, the numerals 10 and 12 designate a pair of measuring vessels or tanks, which are provided with suitable vapor vents, not shown.

Liquid is supplied to the vessels 10 and 12 from a suitable source by a conduit 14 provided with an electrically-actuated pump 16, such conduit 14 having lateral conduits 18 and 20 that discharge into the upper ends of the vessels 10 and 12, respectively. Interposed in the lateral conduits 18 and 20 are inlet valves 22 and 24, respectively. Each of the inlet valves 22 and 24 is of conventional character that is normally closed and which is open solely during the time that it is electrically energized. It is preferred that such valves be fast acting.

An open-ended overflow conduit 26 is connected between the interiors of the vessels 10 and 12, the end of conduit 26 that is disposed within the vessel 10 being upturned and terminating at 28, as shown, while the end in the vessel 12 is downturned, as shown. Another open-ended overflow conduit 30 is connected between the interiors of the vessels 10 and 12, with the end thereof disposed within vessel 12 being upturned and terminating at 32, while its other end is downturned within vessel 10, as shown. Valves 34 and 36, which are of the same character as valves 22 and 24, are interposed within conduits 26 and 30, respectively.

A common drain conduit 38 is provided for both the vessels 10 and 12, such drain conduit 38 having communication with the vessels 10 and 12 by branch drain conduits 40 and 42, respectively. The inlet ends of the branch drain conduits 40 and 42 are disposed above the bottom of their respective vessels, as shown, and such conduits are respectively provided with valves 44 and 46 of the same type as valves 22 and 24.

Drain conduit 38 has interposed therein an electrically-actuated pump 48 and a float chamber 50, as shown.

The electrical means for automatically controlling the operation of the pumps 16 and 48 and the valves 22, 24, 34, 36, 44, and 46 will now be described.

The vessels 10 and 12 are provided with float-actuated double switches 52 and 54, respectively. Each of the double switches 52 and 54 is provided with upper and lower pairs of terminals, as shown. With respect to double switches 52, the arrangement is such that whenever the liquid level in tank 10 is below that indicated by dashed line 56, the upper pair of terminals are electrically bridged, the lower pair of terminals being electrically bridged when the liquid level is above a level at or slightly below that shown at 56. In other words, both the upper and lower pairs of terminals of the float-actuated switches 52 are electrically bridged when the liquid level is at or very near that shown at 56. The electrical bridging of the upper and lower terminals of the double switches 54 corresponds to that of double switches 52 with respect to the fluid level within the vessel 12 designated by the numeral 58.

The vessels 10 and 12 are respectively provided with float-actuated switches 60 and 62. The switches 60 and 62 are each provided with a pair of terminals which are electrically bridged only when the liquid levels in their respective tanks are below the levels indicated by the dashed lines 64 and 66.

The float chamber 50 is of conventional character, the arrangement being such that so long as liquid is entering the same through the drain conduit 38, the liquid level therein will be such as that indicated by dashed line 68 or above. It will be understood, of course, that the float chamber 50 can be provided with suitable vapor venting means, not shown, which will permit liquid to rise and fall within the float chamber 50 while preventing the escape of liquid therefrom. Float-actuated triple switches indicated at 70 are operatively connected to the float chamber 50 so as to be actuated by the float 72. The switches 70 include pairs of terminals 74, 76, and 78. The arrangement is such that whenever the liquid level in the float chamber 50 is below that shown at 68, each of the pairs of terminals 76 and 78 is electrically bridged, with such pairs of terminals being electrically disconnected when the liquid level is that shown at 68 and higher. The pair of terminals 74 are electrically bridged whenever the liquid level within the float chamber 50 is above a level slightly below that shown at 68.

It is to be understood that the pumping capacity of the pump 48 and the dimensions of the conduit 38 and its branches 40 and 42 are such that the liquid level within the float chamber will not fall below that shown at 68, except when liquid is not being drained thereinto from the tanks 10 and 12 by the conduit 38.

A pair of alternating current power leads are designated at 82 and 84 which may be manually connected to leads 86 and 88, respectively, by a master double switch 90 that is normally closed.

One terminal each of solenoids 92 and 94 are connected to the lead 86 by leads 96 and 98, respectively. The other terminal of solenoid 92 is connected in series through the pair of terminals 78, the lower pair of terminals of switches 54, and the pair of terminals of switch 60 to the lead 88 by means of leads 100, 102, 104, 106, and 108. By such an arrangement, the solenoid 92 can only become energized when the pair of terminals 78, the lower pair of terminals of float-actuated switches 54 and the pair of terminals of float-actuated switch 60 are all bridged. In other words, the solenoid 92 can only become energized upon the coincidence of three conditions, namely, no drainage of liquid from the vessels 10 and 12 through the drain conduit 38, vessel 12 being filled to the level 58, and vessel 10 being filled to no greater extent than that indicated by level 64.

Solenoid 94 is connected in series through the pair of terminals 76, the lower pair of terminals of switches 52, and the pair of terminals of switch 62 to the lead 88 by means of leads 110, 112, 114, and 116. In the light of the foregoing, it will be seen that solenoid 94 can only be energized upon the coincidence of three conditions, namely, no drainage of liquid from the vessels 10 and 12 through the drain conduit 38, vessel 10 being filled to the level 56, and vessel 12 being filled to an extent no greater than level 66.

The armatures of the solenoids 92 and 94 are mechanically connected, as at 118, with such connection 118 being electrically insulated from but operatively connected to a movable electrical contact 120. One end of the movable contact 120 is connected to the lead 86, as shown, while the other end of the contact 120 can selectively be in electrical contact with stationary contacts 122 and 124. The solenoids and their arrangement is such that upon energization of the solenoid 94, solenoid 92 being de-energized, the contact 120 is moved into contact with stationary contact 124, and will remain in such contact even after solenoid 94 is de-energized. Upon solenoid 92 being energized, contact 120 will contact the stationary contact 122 and will remain in such contact after de-energization of solenoid 92.

As will be apparent, the solenoids 92 and 94 can never be concurrently energized. In the preferred construction, the movable contact 120 can be manually positioned.

The overflow valve 34 is arranged to be energized whenever the pair of terminals of switch 62 are bridged and the contacts 120 and 124 are in engagement by means of leads 126, 128, 130, and 116. In other words, valve 34 can only be energized to its open position when solenoid 94 has been energized subsequent to any previous energization of solenoid 92, and the fluid level in vessel 12 is at least as low as that indicated at 66.

In an analogous manner overflow valve 36 is arranged to be energized solely during time intervals when contacts 120 and 122 are in electrical contact and the liquid level in vessel 10 is at least as low as level 64. Such arrangement entails the valve 36 being connected in series with the pair of terminals of switch 60 between contact 122 and lead 88 by means of leads 132, 134, 106, and 108.

Drain valve 44 is arranged to be energized solely during time intervals that energization of valve 34 is denied solely by the pair of terminals of switch 62 being electrically disconnected (liquid level in vessel 12 being above level 66). This entails a relay comprising a solenoid 136 and a normally-closed relay switch 138 that is open solely during energization of the solenoid 136. The solenoid 136 is connected between the leads 128 and 130 by leads 140 and 142 so as to be concurrently energized with the valve 34. The valve 44 is connected in series with the relay switch 138 between the contact 124 and the lead 88 by means of leads 126, 144, 146, and 108.

Drain valve 46 has an arrangement similar to that of valve 44. Leads 132 and 134 are connected by leads 148 and 150 to a solenoid 152 that opens a normally closed relay switch 154 during its energization. Valve 46 is connected in series with the relay switch 154 between contact 122 and lead 88 by means of leads 132, 156, 158, and 108.

Inlet valve 22 is arranged to be energized upon electrical contact of the movable contact 120 with the stationary contact 122, provided the upper pair of terminals of switches 52 are bridged. This arrangement takes the form of the valve 22 being connected in series with the upper pair of terminals of switches 52 between contact 122 and lead 88 by means of leads 160, 162, and 108.

In a similar manner, inlet valve 24 is connected in series with the upper pair of terminals of switches 54 between contact 124 and lead 88 by means of leads 164, 166, 168, and 108.

Pump 16 can be a positive-action pump with a pressure by-pass, or a nonpositive-action pump such as a centrifugal pump and is arranged to be energized whenever switch 90 is closed. This is done by connecting the same to leads 86 and 88 by leads 170 and 172. For a reason that will be explained later, the pump 16 has a greater pumping rate than pump 48.

Pump 48 is caused to operate whenever the pair of terminals 74 are bridged by being connected in series therewith between leads 86 and 88 by means of leads 174, 176, 178, and 108.

It is believed that the mode of operation of the illustrated and described embodiment of the invention will be readily understood. Let it be assumed as an initial condition that switch 90 is closed and that contact 120 is in the position shown in the drawing with both vessels being about half full.

Under the stated conditions, pump 16 will be operating, and since contact 124, rather than contact 122, is energized inlet valve 24 will be energized to its open position since the liquid in vessel 12 is below level 58. It will be noted that valves 36 and 46, which are connected to contact 122 are closed.

With respect to vessel 10, valves 22 and 34 will be closed inasmuch as contact 122 is not energized and the terminals of switch 62 are not bridged (the liquid in vessel 12 being above level 66). On the other hand, drain valve 44 of vessel 10 will be energized to its open position inasmuch as solenoid 136 is not energized, and contact 124 is energized. Since vessel 10 is draining, terminals 74 of switch 70 are bridged so that pump 48 is operated, while neither of the pairs of terminals 76 and 78 are bridged because of the high liquid level in 10 the float chamber 50.

The next significant event will be the liquid level in vessel 12 reaching the level 58, whereupon the upper pair of terminals of switches 54 become electrically disconnected so that inlet valve 24 closes. The liquid in vessel 12 now has an opportunity to settle or rest for an interval of time prior to the next significant event, which will be vessel 10 draining to the level 180. The interval of time that the liquid within the vessel 12 is allowed to settle occurs because the rate of filling a vessel is greater than the rate of draining thereof (pump 16 has a higher pumping rate than pump 48), and the pumping rates of pumps 16 and 48 are preferably such that the time interval is sufficient for substantially all of the entrained gases to leave the liquid and for any large aggregations of relatively dense foreign matter to settle to the bottom of the vessel.

Upon vessel 10 becoming empty, solenoid 92 becomes energized to move contact 120 into electrical engagement with contact 122, such energization of the solenoid 92 being a consequence of the liquid level in vessel 10 being below level 64, the liquid level in float chamber 50 being below level 68, and the liquid level in vessel 12 being at 58, so that all the switches in series with the solenoid 92 are closed.

Upon contact 122 thus becoming energized, drain valve 44 is closed and inlet valve 22 is opened. Also overflow valve 36 of vessel 12 is energized to its open position and remains open until the liquid level in vessel 10 has risen to the level indicated at 64. It should be noted that the vertical spacing of the levels 64 and 180 of vessel 10 is substantially greater than that between liquid levels 58 and 182 of vessel 12, so that sufficient time will be required to fill vessel 10 to level 64 for the liquid level in tank 12 to have become lowered to level 182 by overflowing through conduit 30 into vessel 10.

Observance should be made of the fact that liquid level 182 is precisely defined by the vertical position of the upper conduit extremity 32. Upon the liquid level in vessel 10 reaching level 64, drain valve 46 is opened as a consequence of switch 154 closing on the de-energization of overflow valve 36.

The next significant event is that vessel 10 will become filled to level 56, whereupon valve 22 is closed and the liquid in vessel 10 is allowed a time interval to rest or settle until vessel 12 has become empty.

Inasmuch as the control functions applied to each of the vessels 10 and 12 are analogous, no further explanation of the operation is believed to be necessary, except for certain observations.

Inasmuch as the upper end of conduit 30 and the upper end of the drain conduit 42 define fixed levels 182 and 184 in vessel 12, the upper ends of such conduits being analogous to weirs, the vessel 12 will discharge a precise volume of liquid through the drain conduit 38 during each drainage cycle thereof. An exactly equal volume will be discharged from vessel 10 through drain conduit 38 during each drainage cycle of vessel 10, as the same comments may be made about liquid levels 186 and 180 as made about liquid levels 182 and 184.

It will be apparent that since the upper ends of the drain conduits 40 and 42 extend above the bottom of their respective vessels, virtually no relatively dense foreign matter that may settle from the body of the liquid to the bottom of the vessel will be drained through the drain conduits 40 and 42.

Also, since all valves are closed when deenergized, the above-described operative cycles of the vessels simply cease upon an interruption of power at the power source leads 82 and 84 or on opening of the switch 90. Furthermore, closing the switch 90 or a resumption of power at the leads 82 and 84 will simply cause a resumption of the operative functions of the vessels at the point they were discontinued, since the position of the movable contact 120 will have remained unchanged.

The principles of the invention are believed to be particularly well adapted to the measurement of crude oil for delivery from lease storage tanks to a pipe line, especially since such liquids are subject to the entrainment of or evolution of gases and the suspension of either water or solids.

Since the disclosed embodiment of the invention is entirely automatic, so as not to require human supervision for long periods of time, conventional means can be provided for each of the vessels for recording with respect to time, the liquid levels therein, so that the number of units of volume that have been measured can be determined. Alternatively, a mechanical counting device 190 can be operatively coupled to the mechanical connection 118, as indicated diagrammatically by dashed line 192, to count the total number of shifts thereof, it being noted that the connection 118 will shift once each time either of the vessels completes draining its measured unit of liquid.

It will be appreciated that with respect to any or all of the various sensing and recording means that can be applied to the apparatus, the same can be, where electrical in nature, arranged to be energized concurrently with any of the electrically actuated components shown in the drawing, as will be readily appreciated by those skilled in the art.

It has not been intended that the detailed description of the illustrated embodiment of the invention given for the purpose of conveying a full and complete understanding thereof be interpreted as a limitation as to the scope of the invention itself. Accordingly, attention is directed to the appended claims for ascertainment of the actual scope of the invention.

We claim:

1. Liquid measuring apparatus comprising a first and a second vessel, each of said vessels being provided with an inlet conduit and a drain conduit; a normally-closed, electrically-actuated valve in each of said conduits, each of said valves being open solely during electrical energization thereof; first and second power leads, first and second contacts selectively connected to the second power lead; means responsive to the concurrence of a liquid level in the first vessel being at a predetermined low level therein and a liquid level in the second vessel being at a predetermined top level therein for electrically connecting the first contact to the second power lead, means responsive to the concurrence of a liquid level in the second vessel being at a predetermined low level therein and a liquid level in the first vessel being at a predetermined top level therein for electrically connecting the second contact to the second power lead; means for causing each of the last two mentioned means to remain effective until operation of the other is initiated; means responsive to a liquid level in the first vessel being below said top level therein for electrically connecting the valve of the inlet conduit of the first vessel between the first contact and the first power lead, means for electrically connecting the valve of the drain conduit of the first vessel between the second contact and the first power lead; means responsive to a liquid level in the second vessel being below said top level therein for electrically connecting the valve of the inlet conduit of the second vessel between the second contact and the first power lead, and means for electrically connecting the valve of the drain conduit of the second vessel between the first contact and the first power lead.

2. The combination of claim 1 including means for counting each occurrence of either of said first and second contacts being selectively connected to the second power lead.

3. Liquid measuring apparatus comprising a first and a second vessel, each of said vessels being provided with an inlet conduit, a drain conduit, and an overflow conduit arranged to overflow into the other vessel; a normally-closed, electrically-actuated valve in each of said conduits, each of said valves being open solely during electrical energization thereof; first and second power leads, first and second contacts selectively connected to the second power lead; means responsive to the concurrence of a liquid level in the first vessel being at a predetermined low level therein and a liquid level in the second vessel being at a predetermined top level therein for electrically connecting the first contact to the second power lead; means responsive to the concurrence of a liquid level in the second vessel being at a predetermined low level therein and a liquid level in the first vessel being at a predetermined top level therein for electrically connecting the second contact to the second power lead; means for causing each of the last two mentioned means to remain effective until operation of the other is initiated; means responsive to a liquid level in the first vessel being below said top level therein for electrically connecting the valve of the inlet conduit of the first vessel between the first contact and the first power lead, means for electrically connecting the valve of the drain conduit of the first vessel between the second contact and the first power lead, means for electrically connecting the valve of the overflow conduit of the first vessel between the second contact and the first power lead and also for rendering the last mentioned means ineffective in response to a liquid level in the second vessel being below a predetermined lower intermediate level therein; means responsive to a liquid level in the second vessel being below the top level therein for electrically connecting the valve of the inlet conduit of the second vessel between the second contact and the first power lead, means for electrically connecting the valve of the drain conduit of the second vessel between the first contact and the first power lead, means for electrically connecting the valve of the overflow conduit of the second vessel between the first contact and the first power lead and also for rendering the last mentioned means ineffective in response to a liquid level in the first vessel being below a predetermined lower intermediate level therein; each of said overflow conduits having its inlet end at a predetermined upper intermediate level with respect to the vessel associated therewith.

4. The combination of claim 3, wherein the volume within each vessel between the lower intermediate level therein and the low level therein is substantially greater than that between the upper intermediate level therein and the top level therein.

5. The combination of claim 3, including means for causing the rate of liquid flow through the inlet conduits to exceed substantially the rate of liquid flow through the drain conduits.

6. The combination of claim 3, wherein the volume within each vessel between the lower intermediate level therein and the low level therein is substantially greater than that between the upper intermediate level therein and the top level therein, and means for causing the rate of liquid flow through the inlet conduits to exceed substantially the rate of liquid flow through the drain conduits.

7. The combination of claim 3, wherein the fifth and sixth recited means together comprise a float-actuated electric switch operatively connected to the second vessel, said float-actuated switch being in electrical series with the valve of the overflow conduit of the first vessel, an electric relay including a solenoid and a normally-closed relay switch that is open solely during energization of the solenoid, said solenoid being connected in electrical parallel with the valve of the overflow conduit of the first vessel, said relay switch being connected in electrical series with the valve of the drain conduit of the first vessel.

References Cited in the file of this patent

UNITED STATES PATENTS

| 1,340,293 | Roach et al. | May 18, 1920 |
| 1,424,176 | Nicholson | Aug. 1, 1922 |
| 1,740,875 | Porte | Dec. 24, 1929 |
| 1,874,349 | Read | Aug. 30, 1932 |
| 2,158,381 | Raymond | May 16, 1939 |

FOREIGN PATENTS

| 765,258 | France | March 19, 1934 |